Jan. 15, 1952  H. KOPLIN ET AL  2,582,259
APPARATUS FOR BUILDING-UP AND REDUCING PRESSURE
Filed Nov. 4, 1944  3 Sheets-Sheet 1

Inventors.
Harry Koplin
Arthur R. Slate
by Parker & Carter,
Attorneys.

Jan. 15, 1952     H. KOPLIN ET AL     2,582,259
APPARATUS FOR BUILDING-UP AND REDUCING PRESSURE
Filed Nov. 4, 1944     3 Sheets-Sheet 3

Inventors.
Harry Koplin
Arthur R. Slate
by Parker & Carter
Attorneys

Patented Jan. 15, 1952

2,582,259

UNITED STATES PATENT OFFICE 2,582,259

APPARATUS FOR BUILDING UP AND REDUCING PRESSURE

Harry Koplin and Arthur R. Slate, Chicago, Ill., assignors to Zephyr Laundry Machinery Company, Chicago, Ill., a corporation of Illinois Application November 4, 1944, Serial No. 562,006

3 Claims. (Cl. 277—70)

This invention reulates to a valve system, and particularly a valve system for use in connection with extractors such as are used in the laundry art and other arts for extracting water or other liquids from solid material. Where extractors are of large capacity, considerable difficulty has been encountered in the manual operation of the valve or valves used in the apparatus and in preventing leakage through the usual rotary type of valve when using high operating pressures.

One of the objects of this invention is, therefore, to provide a valve arrangement for extractors in which a relatively small pilot valve may be used to control the operation of either the inlet or exhaust valves of the apparatus, which valves are operated by power—preferably by fluid pressure used in the apparatus—and which inlet or exhaust valves are of the self-closing poppet valve type to minimize leakage.

Another object of the invention is to provide a mechanism by means of which water may enter an extractor tub or receptacle at the normal pressure at which the water is supplied by a city system and then, by means of a pump and associated controls, to increase the pressure to a desired point to retain the pressure at that point for a predetermined period and thereafter to release the pressure and discharge the water.

Another object is to provide a convenient mechanism for accomplishing the purpose indicated.

A still further object is to provide controls for operating and for controlling the operation of the mechanism.

Other objects will appear from time to time throughout the course of the specification and claims.

The invention is illustrated more or less diagrammatically in the accompanying drawings, wherein:

Figure 5 is a detail illustrating the valve 73 in the open or discharge position;

Figure 6 is a schematic diagram generally similar to Figure 4, but illustrating a modified construction in which the main valve which controls the flow of water in the inlet direction is arranged for manual operation.

Like parts are indicated by like symbols throughout the specification and drawings.

Figure 1:
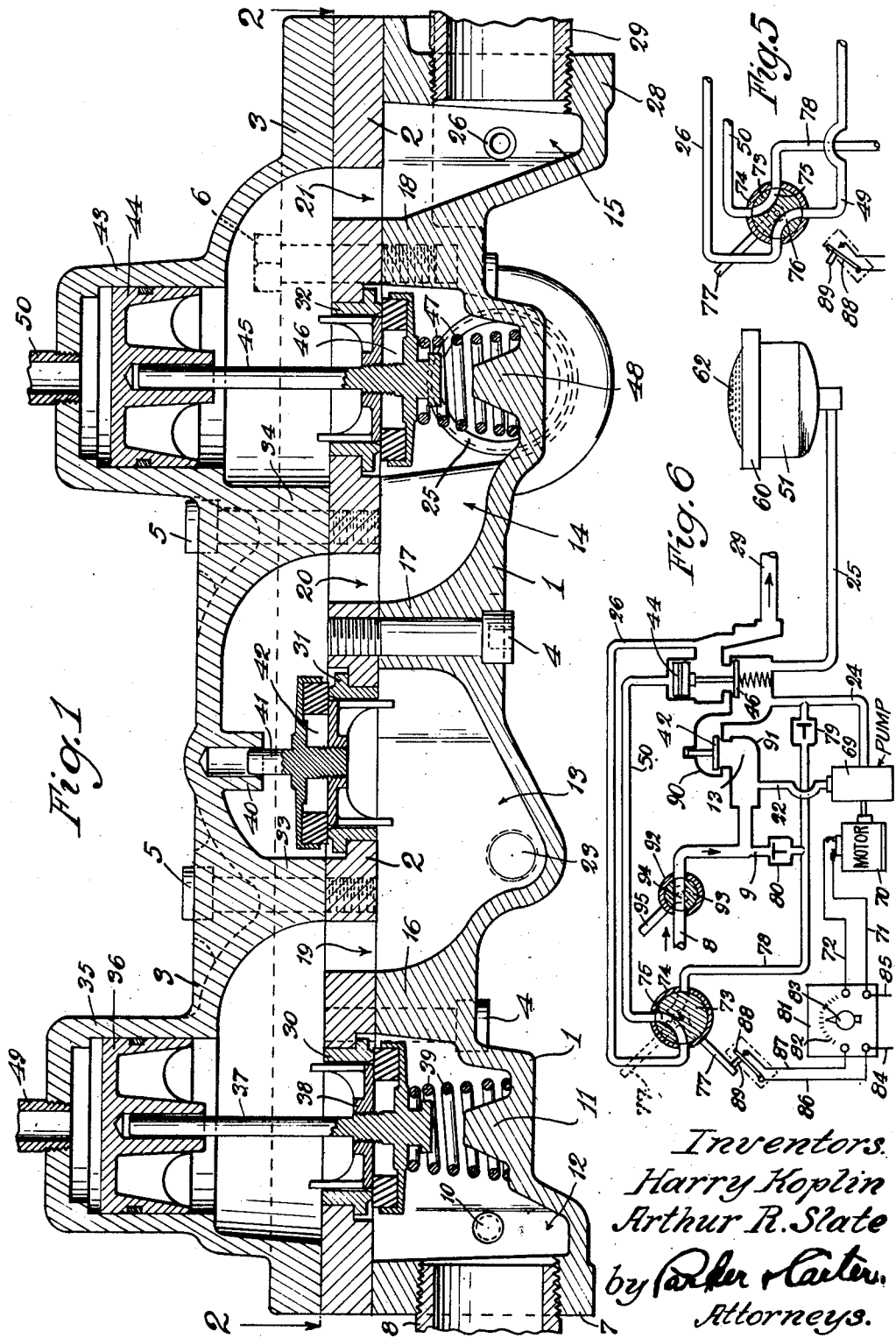
Figure 1 is a section through the valve assembly of the invention.

The valve assembly as illustrated in detail in Figures 1 and 2 includes housing members, valve parts, inlet passages and other features which will now be described. As shown the valve housing includes a lower housing member 1, a valve carrying plate 2 and an upper housing section 3. The lower housing section 1 is fastened to the valve plate by means of screws 4 or otherwise and the upper housing section 3 is fastened to the valve plate 2 by screws 5 or otherwise and the entire assembly may be joined together additionally by screws 6 or by other fastening means. One particular advantage of this construction is that the valve seats and to a large degree the valve assemblies are carried in a single member, namely, the member 2 and either of the housing sections may be removed for repair or readjustment with a minimum of displacement of the valve parts.

The housing section 1 is provided with an inlet connection 7 which is threaded to receive a pipe or conduit 8 through which water or other fluid may enter the system. An outlet member 9 is connected to a suitable opening in the housing 1 adjacent the inlet connection 7. In order that the outlet connection may be positioned on either side of the assembly if desired a corresponding opening which as shown is closed by a plug 10 may be provided. The housing section 1 is provided with a spring seat or centering member 11.

As shown, the housing section 1 is arranged to form four chambers. The first is the chamber 12 adjacent the inlet 7; the second is the chamber 13; the third is the chamber 14; and the last is an outlet chamber 15. Between the chambers 12, 13, 14 and 15 the housing is provided with raised portions 16, 17 and 18 respectively. In each of the chambers 12, 13 and 14 is an opening in which a valve seat is carried and valves are arranged to control the flow of fluid through the valve seats and to and from the chambers. A constantly open port 19 is in communication with the chamber 13 and a constantly open port 21 is in communication with the chamber 15. The chamber 13 is provided with openings, either one of which may receive an outlet pipe or conduit 22. Accordingly, the other opening is shown as having been closed by a plug 23. The chamber 14 is shaped to receive two pipes or conduits 24 and 25 which are arranged for communication with the pump, as will be described below. The outlet chamber 15 is arranged to receive the conduit or pipe 26 and is provided with two openings, only one of which will be used, the one not in use being closed by a plug 27. Adjacent and communicating with the outlet chamber 15 is an outlet connection 28 in which a pipe or conduit 29 is received.

The valve plate 2 is provided with openings in addition to the ports 19, 20 and 21 and in this valve plate openings three valve seats 30, 31 and 32 are seated.

The upper section 3 is shaped generally to correspond with the lower housing section 1 and is provided with two partitions 33 and 34 which interrupt the housing. The partition 33 interrupts the housing adjacent the port 19 and the partition 34 interrupts the housing adjacent the port 20.

The housing section 3 is provided with a cylinder 35 within which a piston 36 is positioned for movement. A piston rod 37 joins the piston 36 to a valve 38 which is positioned to be seated upon the valve seat 30 and is normally urged in the seating direction by a spring 39 which bears upon the lower face of the valve assembly and is seated about the member 11 in the housing section 1.

The housing section 3 is also provided with a guiding portion 40 within which a stem 41 of a valve 42 is positioned and guided. This valve is operated by gravity and is in position to be seated upon the valve seat 31. This valve is not provided with positive means for seating and may be seated by gravity or fluid pressure within the system.

The housing section 3 is provided with a second cylinder 43 within which a piston 44 is mounted. A rod 45 connects the piston 44 to a valve assembly 46. This valve assembly is mounted to be seated upon the valve seat 32 and is urged in the closing direction by a spring 47 which bears at one end upon a lower part of the valve assembly and at its opposite end bears upon the floor of the housing section 1 and is centered and positioned by a projection 48 formed in the housing section 1. The cylinder 35 is connected to a pipe or conduit 49 which may act as an inlet or outlet for fluid pressure and correspondingly the cylinder 43 is connected to the pipe or conduit 50 which may act as an inlet or outlet for fluid pressure.

Figure 3:
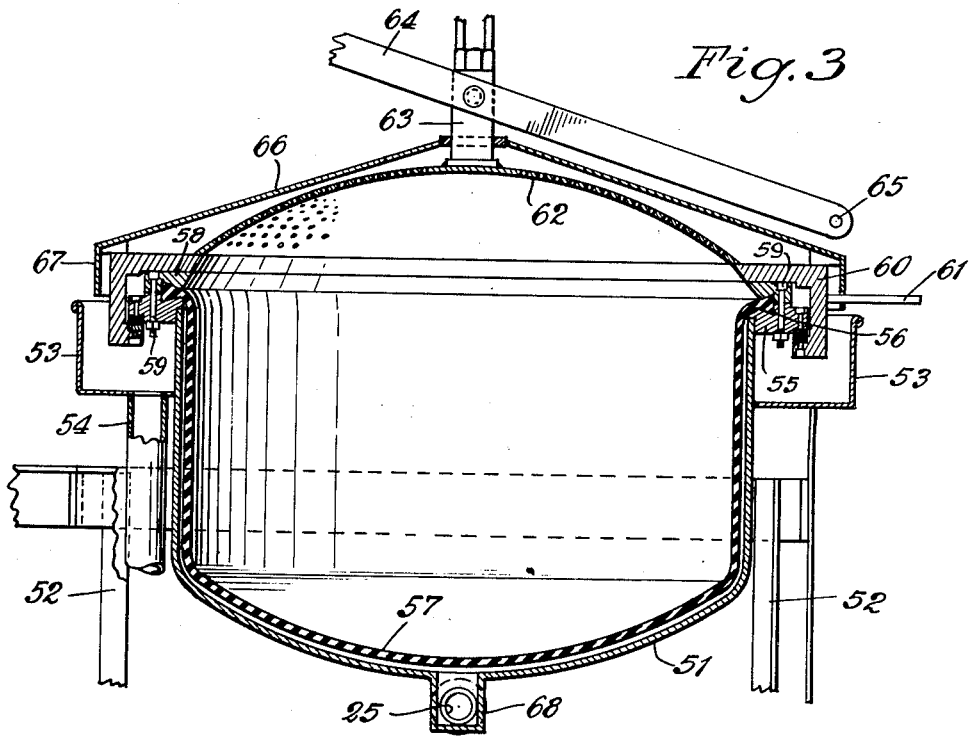
Figure 3 is a vertical section through one form of a tub to which the system may be applied.

There is shown a tank or tub 51 in Figure 3. The tank may be supported in any suitable manner and on any desirable supporting means. Members 52 are shown to indicate only diagrammatically the probable presence of a supporting framework. Positioned about the tank 51 and preferably adjacent its upper edge is a water receiving trough 53 from which an outlet pipe 54 leads to any desired point for water disposal.

Secured to the upper edge of the tank is a flange 55 which is provided with a groove or depression 56 as shown. In this depression upper edge of a flexible liner 57 is seated. The liner may be of rubber or any suitable normally water impervious and flexible member. A cooperating flange 58 is held to the flange 55 by bolts 59 or other means and serves to secure the upper edge of the flexible liner 57 in air and water tight connection with the upper edge of the tank 51. A cover flange member 60 is mounted to engage the flange 55. It may be secured to the flange by bayonet joints, mutilated screw connections or other means which need not be shown in detail. The handle 61 may be used to rotate the flange member 60 into engaging and disengaging position. Secured to the cover flange 60 is a perforated dome-like member 62. A member 63 is secured to the dome 62 and is movably joined to a lifting handle 64 which is mounted upon a support not shown and may be provided with a handle portion 65 for raising. The details of the raising mechanism form no essential part of the invention and are not illustrated. A shield 66 is mounted on the member 63 and as shown overlies the entire top of the member 51 and associated parts and provided with a downwardly extending flange 67. The tank or tub 51 is provided with a connection member 68 to which a conduit 25 is joined. The conduit may be used as an inlet and an outlet member.

Figure 4:
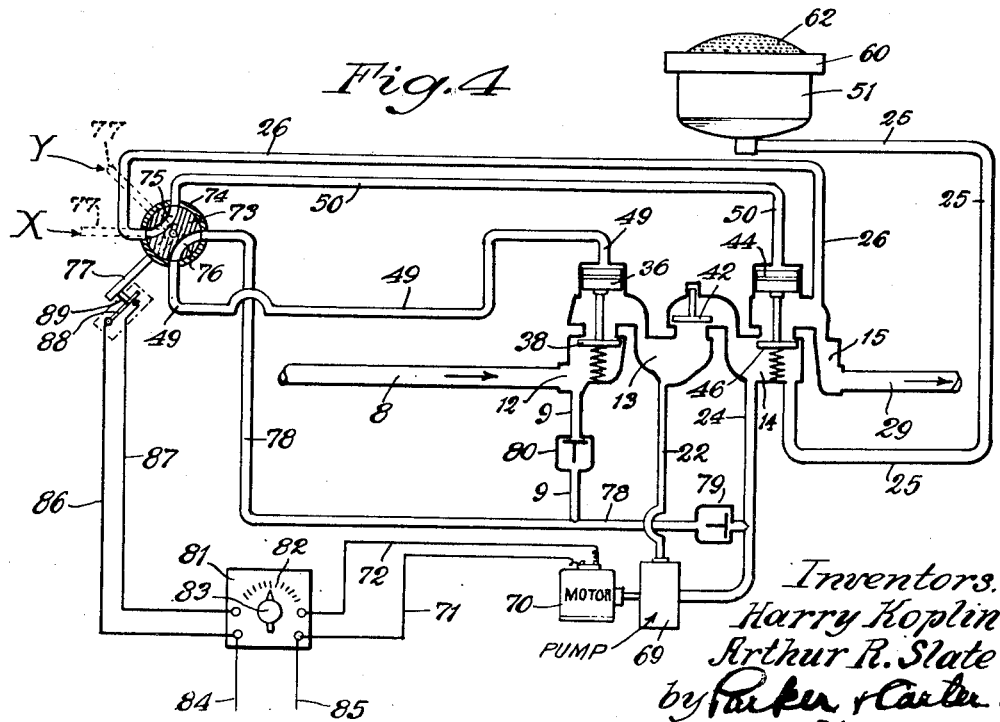
Figure 4 is a schematic diagram illustrating the system and its various parts.

The parts above mentioned are shown diagrammatically in assembled position in Figure 4 and as there shown the conduits 22 and 24 are in communication with a pump 69 which may be operated by a motor 70 which receives current through wires 71, 72. A control valve 73 is mounted in a housing 74 and is provided with passages 75 and 76 and with an operating lever 77. The conduits 26 and 50 are connected to the housing 74 and when the valve is in the position shown in Figure 4 they are in communication with the passage 75. Conduits 49 and 78 are connected to the housing 74 and when the valve is in the position shown in Figure 4 they are in communication with the valve passage 76. The conduit 78 at its other end is connected through a check valve 79 with the conduit 24. A second check valve 80 is positioned in the conduit 9 which conduit is connected at one end to the valve housing and at the other to the conduit 78. The conduit 22 is connected also to the housing section 1 and to the pump 69.

The operation of the mechanism may be controlled by a timer 81. The timer is provided with dial calibrations 82 and setting means so that it may be set to operate for a predetermined time. A setting lever 83 is shown by means of which the setting of the valve may be controlled and understood. The timer is connected to a source of electricity by wires 84 and 85. The wires 71 and 72 which are connected to the motor are also connected to the timer. Additional wires 86 and 87 are connected to a starting switch 88 which is provided with a member 89. This member may be contacted and the switch closed by the control valve handle 77 and this is the case as shown in Figure 4. It would not be the case when the handle is in the position X, which is the neutral position during which the valve is completely closed, or in the position Y, which is the exhaust position.

In operating the device the timer is set in advance to keep the circuit closed for a predetermined time. When the handle 77 is moved to close the switch 88 the circuit through the timer is closed and the motor will be actuated. Thereafter the timer operates without further control from the handle 77 over the switch 88 and will keep the circuit closed for the predetermined time for which the timer has been set. Obviously the invention is not limited to the particular timing or electrical control mechanisms. In some instances the timer 81 may be dispensed with, in which instance the switch 88 will control the starting and stopping of the motor 70 directly.

As shown in Figure 4, the valve 73 is set to the inlet or filling position, and as shown in Figure 5, the same valve is set to the outlet or open position, which it occupies when the tub or tank 51 is to be emptied.

The modified structure of Figure 6 differs from that shown in Figure 4 in that the automatic opening of the main valve 38, by means of which liquid enters the chamber 13 of the main valve housing, has been removed and a manual control is substituted therefore. By reason of this construction the valve 38, the piston 36 and associated housing parts are omitted, as is also the pipe or conduit 49 and since these pipes or conduits are omitted, the passage 76 through the valve member 73 is omitted. Otherwise the mechanism is substantially that shown in Figure 4 and most of the parts remain. Where the same parts occur both in Figure 4 and Figure 6 without alteration of design or function, they are given the same number in each figure.

Figure 2:
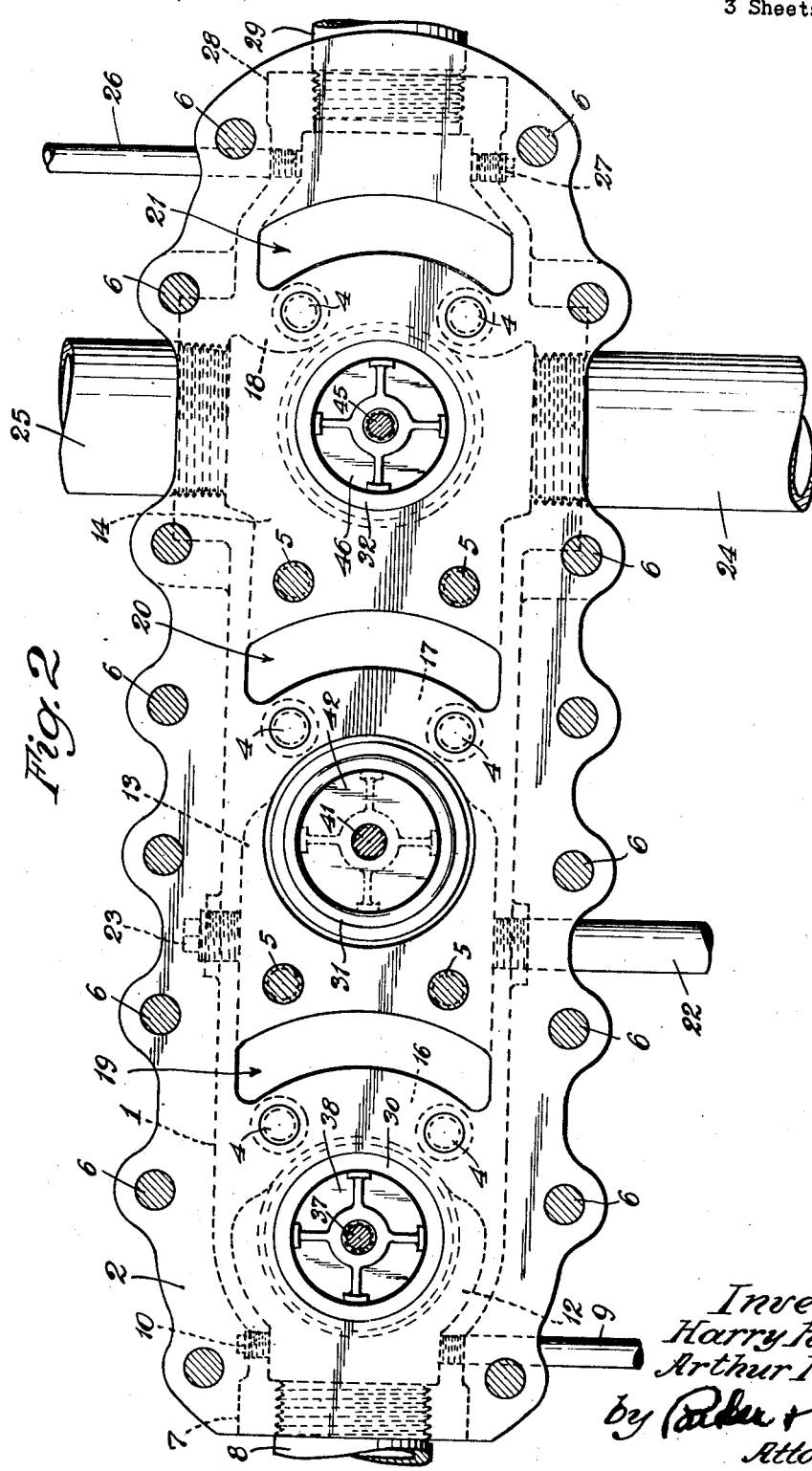
Figure 2 is a section taken at line 2—2 of Figure 1.

The valve housing which encloses the single valve 42 in the form of Figure 6 may be made of several parts, as is the main valve housing illustrated in detail in Figures 1 and 2 and shown diagrammatically in Figure 4, or it may be made otherwise. This housing may, for purposes of convenience, be considered as being made of three parts: an upper section 90, a main lower section 91, and a valve plate or seat carrying member.

The valve seat member 2 of Figure 4 is not shown in Figure 6 but may be present, if desired. The main water conduit 8 communicates with a valve housing 92 within which is positioned a valve 93. This valve has a passage 94 formed through it and is provided with a handle 95 by means of which it may be moved. When the valve 93 is moved to the position of Figure 6, liquid reaches the valve 42 and raises it to permit passage of liquid from the chamber 13 which corresponds exactly to the chamber 13 of Figure 4. The mechanism of the other parts and their operation is the same as that shown in Figure 4 and need not be redescribed.

It will be realized that whereas we have described and illustrated a practical and operative device, nevertheless many changes may be made in the size, shape, number and disposition of parts without departing from the spirit of the invention. We therefore wish our description and drawings to be taken as in a broad sense illustrative or diagrammatic, rather than as limiting us to our precise showing.

The use and operation of the invention are as follows:

We shall refer to the valve assembly and housing members shown in detail in Figures 1 and 2 as comprising the operating valve or operating valve assembly because this whole unit operates as a valve assembly. Where this expression occurs throughout the discussion below it is to be understood as meaning generally the structure shown in detail in Figures 1 and 2.

When the device is to be used water may conveniently be supplied to the machine through the pipe 8 which will ordinarily be connected to the city water main or other source of water supply from which the water is supplied at a pressure normally less than that at which it is desired to use it.

With the system connected to a source of water supply the handle 77 which may have been at the neutral position indicated at X in Figure 4 is moved from that position to the full line or filling position shown and allows the water under city pressure to pass through the line 8 to the main valve assembly which is illustrated in detail in Figures 1 and 2. It passes through the outlet 9 and the check valve 80 in that outlet thence through the line 78 to the valve 73 and through the line 49 bringing city pressure on top of the piston 36 in the main operating valve assembly.

This pressure is effective through the piston 36 to open the valve 38 and to allow water under city pressure to enter into the first chamber of the main operating valve assembly. Thence the water moves into the chamber 13 under the check valve 42 lifting it and passing through the port 20 into the chamber 14 and through the pipe or line 25 to the tub 51 thus building up pressure in the tub until it reaches city pressure.

When the lever or handle 77 of the valve 73 is moved to the full line or filling position of Figure 4 as above described it contacts the switch and brings the members 88, 89 into contact thus starting the reset timer 81 which starts the motor 70 and the pump 69. After city pressure has been reached in the tank 51 the pump 70 then begins to boost the pressure to the required amount drawing through the line 22 from the main operating valve assembly. In turn the high pressure backs up through the check valve 79 through the line 78, the control valve 73 and the line 49 in turn increasing the pressure on the piston 36. This high pressure in the line 78 cannot back up through the outlet 9 because of the check valve 80.

The reset timer 81 is set for a definite period of time which allows the high pressure in the tank 51 to come up to the desired point and to remain there for the required period of time, after which the reset timer 81 breaks the circuit and cuts out the motor pump 70 and stops the operation of the pump 69.

To exhaust the water from the tank 51 the lever 77 is moved to the position Y which is the exhaust position as shown in Figure 5. When the valve is moved to this position pressure from above the piston 36 is allowed to escape through the line 49 and out through the exhaust line 26. This action permits the valve 38 to close under the influence of the spring 39.

High pressure in the tank 51 is effective back along the line 25 and the operating valve assembly of Figures 1 and 2, through the check valve 79 the line 78, the valve 73, the line 50 and into the cylinder 43 of the operating valve assembly above the piston 44. As the piston 44 is of greater area than the upper surface of the valve assembly this pressure exerted on the piston 44 actuates the valve assembly 46 opening it and allowing the water under high pressure to exhaust through the valve past the seat 32 to the exhaust line 29. As the pressure drops almost instantaneously the check valve 79 closes and the check valve 80 opens allowing the city pressure to carry through the line 78, the control valve 73, the line 50 into the operating valve assembly above the piston 44 and thus keeping the valve 46 open for the required period of time to empty the tank 51. As the water exhausts from the tank in the operating valve assembly the pressure on the exhaust side drops as the valve 38 is closed and the city water pressure is cut off and cannot then pass through the operating valve assembly.

We have spoken above of the fact that water moves to the tank 51 through the pipe 25. The pipe 25 is connected to the connection 68 which discharges fluid between the wall 51 of the tank and the liner 57 so that the tank is not itself filled by water which flows through the pipe 25. The contents of the tank whether they be articles for washing or for other treatment are put in when the cover 62 and the shield 66 have been moved to the open position by the handle 64, 65. When pressure between the rigid wall 51 and the flexible wall 57 is sufficiently high the latter will be raised and will carry the contents of the tub upwardly and if the contents be moist articles which have been washed and the pressure is sufficient they will be forced against the perforated member 62 and the water wholly or largely forced from them. The water then flows downwardly beneath the shield 66 and is guided by the flange 67 into the basin or trough 53 from which it may flow through the discharge pipe 54. When pressure between the rigid wall 51 and the flexible wall 57 is reduced the wall 57 returns to the position shown in Figure 3.

The modified form of Figure 6 is generally the same as that described above in connection with Figure 4, except that manual operation is provided for the main valve. Thus the parts as shown in Figure 6 are in the filling position. Liquid reaches the valve assembly through the conduit 8 and the valve 93, passes to the chamber 13, raises the valve 42 and passes outwardly through the conduit 25 to the tub or tank 51. At the same time that this operation is taking place, the handle 77 is in the position shown in Figure 6, the circuit is completed and the motor 70 is actuated by means of the timer 81 and the motor thus drives the pump 69.

When the tank is full and is to be emptied, the valve handle 92 is closed. The valve handle 77 is moved to the dotted line position of Figure 6 and the operation generally described in connection with Figure 4 takes place and the contents of the tank or tub 51 are discharged.

We claim:

1. In combination in a valve assembly, two housing sections and an intermediate valve plate member and means for fastening the two sections and the plate member together to form a composite valve housing assembly, there being a plurality of valve seats in said valve plate and a plurality of valves arranged to cooperate with said seats and a plurality of cylindrical sections formed in said housing and pistons in said sections one for each of said valves, said housing members forming conduit means whereby fluid is directed from one valve to another and a check valve positioned intermediate said valves and in the path of fluid from one to the other, main inlet and outlet connections to one of said housing sections and a plurality of auxiliary outlet connections to said housing section.

2. In combination in a valve assembly, two housing sections and an intermediate valve plate member and means for fastening the two sections and the plate member together to form a composite valve housing assembly, there being a plurality of valve seats in said valve plate and a plurality of valves arranged to cooperate with said seats and a plurality of cylindrical sections formed in said housing and pistons in said sections one for each of said valves, and spring means positioned on the side of said valves opposite said pistons and biased to hold said valves seated, said housing members forming conduit means whereby fluid is directed from one valve to another and a check valve positioned intermediate said valves and in the path of fluid from one to the other, main inlet and outlet connections to one of said housing sections and a plurality of auxiliary outlet connections to said housing section.

3. In combination in a composite assembly, a valve plate, a plurality of openings formed therein and a plurality of oppositely facing seats associated therewith, valves arranged to seat on said seats, two of said valves being positioned on one side of said plate and another on the opposite side of said plate, springs arranged for said two valves biased to hold them seated and pistons one for each of said two valves, a cylinder for each of said pistons and means for conducting fluid to said cylinders to cause unseating of said valves in response to a predetermined degree of pressure, and a housing comprising a pair of cooperating housing members positioned one on each side of said plate, said cylinders being formed in one of said housing members and said springs being seated on the other of said housing members, said housing members together with said plate defining a fluid passage controlled by said valves and arranged generally to guide fluid from end to end of said assembly.

HARRY KOPLIN.
ARTHUR R. SLATE.

REFERENCES CITED

The following references are of record in the file of this patent:

UNITED STATES PATENTS

| Number | Name | Date |
|---|---|---|
| 754,113 | Astfalck | Mar. 8, 1904 |
| 1,258,342 | Justen | Mar. 5, 1918 |
| 1,447,304 | Hauk | Mar. 6, 1923 |
| 1,578,233 | Ferris | Mar. 23, 1926 |
| 1,682,172 | Ernst | Aug. 28, 1928 |
| 1,765,627 | Stacy | June 24, 1930 |
| 1,849,283 | Crane | Mar. 15, 1932 |
| 1,926,378 | Getz | Sept. 12, 1933 |
| 1,985,485 | Crane | Dec. 25, 1934 |
| 2,022,018 | Van Westrum | Nov. 26, 1935 |
| 2,096,356 | Fox | Oct. 19, 1937 |
| 2,138,503 | O'Brien | Nov. 29, 1938 |
| 2,220,479 | De Bell | Nov. 5, 1940 |
| 2,313,623 | Bungay | Mar. 9, 1943 |
| 2,362,713 | Mott | Nov. 14, 1944 |

FOREIGN PATENTS

| Number | Country | Date |
|---|---|---|
| 347,243 | Great Britain | of 1931 |
| 356,133 | Great Britain | of 1930 |